United States Patent
Deng et al.

(10) Patent No.: US 11,554,343 B1
(45) Date of Patent: Jan. 17, 2023

(54) MOVABLE CARBON CAPTURE SYSTEM APPLIED TO AGRICULTURE-HARMONIOUS BUILDINGS

(71) Applicant: Tianjin University, Tianjin (CN)

(72) Inventors: Shuai Deng, Tianjin (CN); Kailong Wu, Tianjin (CN); Bowen Liu, Tianjin (CN); Li Zhao, Tianjin (CN); Shuangjun Li, Tianjin (CN); Mengchao Chen, Tianjin (CN); Lijin Chen, Tianjin (CN); Jie Zhao, Tianjin (CN)

(73) Assignee: TIANJIN UNIVERSITY, Tianjin (CN)

( * ) Notice: Subject to any disclaimer, the term of this patent is extended or adjusted under 35 U.S.C. 154(b) by 48 days.

(21) Appl. No.: 17/382,616

(22) Filed: Jul. 22, 2021

(51) Int. Cl.
    *B01D 53/00* (2006.01)
    *B01D 53/04* (2006.01)
    *A01G 9/24* (2006.01)

(52) U.S. Cl.
    CPC ......... *B01D 53/0446* (2013.01); *A01G 9/246* (2013.01); *B01D 2253/102* (2013.01); *B01D 2253/108* (2013.01); *B01D 2253/204* (2013.01); *B01D 2257/504* (2013.01); *B01D 2259/40088* (2013.01); *B01D 2259/4508* (2013.01)

(58) Field of Classification Search
None
See application file for complete search history.

(56) References Cited

FOREIGN PATENT DOCUMENTS

CN      207383068 U   *   5/2018

* cited by examiner

*Primary Examiner* — Sharon Pregler
(74) *Attorney, Agent, or Firm* — Shumaker, Loop & Kendrick, LLP; James D. Miller

(57) ABSTRACT

A movable carbon capture system applied to agriculture-harmonious buildings, which includes a carbon capture unit and a high-concentration $CO_2$ supply unit which are respectively integrated, wherein the carbon capture unit comprises a $CO_2$ adsorption chamber and an air pump, and the high-concentration $CO_2$ supply unit comprises a vacuum pump and an air storage cavity; an air inlet of the $CO_2$ adsorption chamber is connected to the indoor environment, an exhaust port of the $CO_2$ adsorption chamber is connected to an atmosphere outlet, an air outlet of the $CO_2$ adsorption chamber is connected with an air inlet of the vacuum pump, an air outlet of the vacuum pump is connected with an air inlet of the air storage cavity, an air outlet of the air storage cavity is connected with a greenhouse air supply port, and the greenhouse air supply port is connected with a greenhouse.

5 Claims, 1 Drawing Sheet

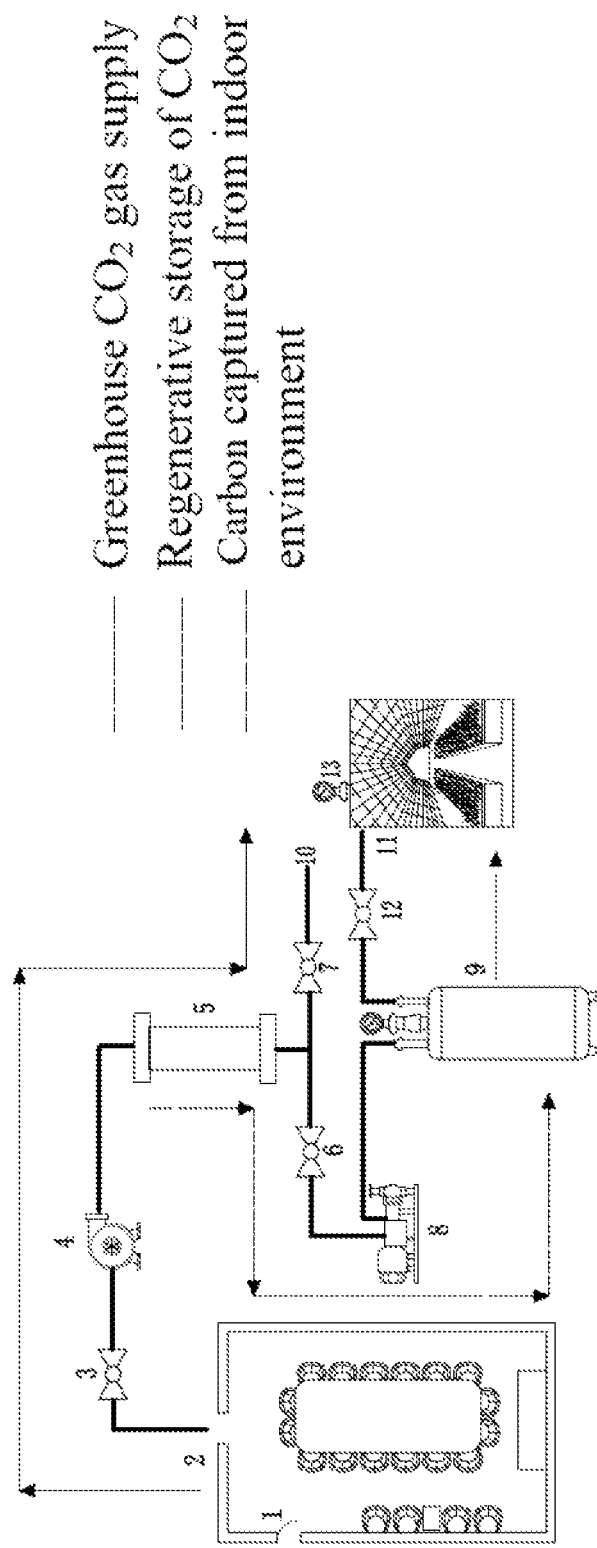

US 11,554,343 B1

MOVABLE CARBON CAPTURE SYSTEM APPLIED TO AGRICULTURE-HARMONIOUS BUILDINGS

TECHNICAL FIELD

The present disclosure belongs to the technical field of carbon capture, and specifically relates to a movable carbon capture system combined with agricultural and indoor environment control function.

BACKGROUND ART

As the pace of life is continuously accelerated and the pressure of life is continuously increased, the time for people to work intensively is continuously prolonged. $CO_2$ is an important factor influencing the quality of indoor air, and if the concentration cannot be effectively controlled, people working in buildings for a long time are likely to feel uncomfortable. The volume concentration of carbon dioxide in fresh air is 0.036-0.0039%, the increase of the concentration of carbon dioxide can cause the increase of blood pressure and dyspnea, and the importance of improving the indoor air quality is self-evident.

On one hand, the technology of directly capturing carbon from the interior of the building can effectively reduce the $CO_2$ concentration in the building and improve the indoor air quality. The carbon capture process in the adsorption method is simple, and is suitable for distributed carbon capture systems. The enriched $CO_2$ is mainly used in the aspects of food processing, oil displacement and the like, and is not effectively utilized in other fields.

On the other hand, $CO_2$ is a raw material for photosynthesis of plants, and plays an important role in promoting growth of the plants, so that it is of significant meaning to improve the $CO_2$ concentration in the greenhouse. Common methods for increasing the $CO_2$ concentration in the greenhouse include a chemical method, a combustion method, a biological method, application of a large amount of organic fertilizer and the like. However, the methods often have the problems of high cost, environmental pollution and the like.

Some inventors have tried to make innovations in terms of increasing $CO_2$ concentration in the greenhouse. For example, the patent with the publication number of CN109601201A provides a system for applying $CO_2$ to a greenhouse by using a normal-pressure hot-water boiler and a treatment method of the greenhouse, and necessary $CO_2$ is provided for the growth of crops by utilizing flue gas discharged from a hot-water boiler system through efficient utilization of waste gas; and meanwhile, the flue gas exhausted by the hot-water boiler is treated, and cleaning treatment and utilization of the flue gas are achieved. The patent with the publication number of CN108753843A utilizes the byproduct $CO_2$ generated in the biogas engineering purification process to solve the problem of $CO_2$ deficiency in greenhouse production in winter, meanwhile, according to the crop photosynthesis law, staged and precise $CO_2$ release is achieved, and the agricultural production efficiency is greatly improved; and through $CO_2$ gas fertilization, the maximum resource utilization of organic wastes is realized, and the carbon pollution of large biogas engineering is reduced. The patent with the publication number of CN207383068U provides a greenhouse $CO_2$ gas applying device, $CO_2$ can be automatically produced by utilizing a lime powder box and a diluted hydrochloric acid box, the $CO_2$ is stored in a storage tank, and the generated $CO_2$ is introduced into a greenhouse. The patent with the publication number CN108031238A, the patent with the publication number CN109258241A, the patent with the publication number CN206193515U and the like are similar methods for increasing the concentration of $CO_2$ at home and abroad. However, the innovation point of the above patents lies in that the $CO_2$ concentration in the greenhouse is increased through industrial means, and that the $CO_2$ in the closed space is a source of carbon fertilizer is rarely reported.

Other inventors have tried to make innovations in the use of $CO_2$. For example, the patent with the publication number of CN109534959A provides a method for decomposing sodium phenolate by utilizing $CO_2$, a water phase containing sodium bicarbonate is generated, the PH value of the water phase is controlled, primary crude phenol is mixed with water for secondary decomposition, and high sodium phenolate decomposition rate and crude phenol content are achieved. The patent with the publication number of CN208667504U provides an electric burning lime kiln for generating electricity by recycling $CO_2$, $CO_2$ gas generated in lime production is used for generating electricity, lime is calcined by using electric energy, the electric burning lime kiln is simple and novel in structure and convenient to use and operate, the $CO_2$ gas in lime production can be collected and recycled, and zero emission of $CO_2$ is basically achieved. The patent with the publication number CN105819445A provides a method for sealing $CO_2$ in deep sea, energy is released by utilizing energy storage and phase change of $CO_2$, $CO_2$ collection, compression, transportation and injection equipment is driven to carry out $CO_2$ capture, dry ice preparation, transportation and injection into the seabed, green energy is fully utilized, the cost of the $CO_2$ sealing process is effectively reduced, and atmospheric pollution and greenhouse effect are reduced. However, the utilization of $CO_2$ in the above patents is limited, is basically based on industrial application, and is not tightly combined with actual work and life.

SUMMARY

The present disclosure aims to solve the technical problem that reduction of $CO_2$ concentration in a building and promotion of plant growth are not flexibly and effectively combined in the prior art and provides a movable carbon capture system applied to agriculture-harmonious buildings, waste is turned into wealth, $CO_2$ with lower concentration is captured from the interior of the building, enriched to higher concentration and stored, and meanwhile, and $CO_2$ with proper concentration is supplied to the greenhouse, so that waste recycling of $CO_2$ is realized.

In order to solve the technical problem, the present disclosure is realized through the following technical scheme:

A movable carbon capture system applied to agriculture-harmonious buildings comprises a carbon capture unit and a high-concentration $CO_2$ supply unit, the carbon capture unit comprises a $CO_2$ adsorption chamber and an air pump, and the high-concentration $CO_2$ supply unit comprises a vacuum pump and an air storage cavity; an air inlet of the $CO_2$ adsorption chamber is connected to the indoor environment through the air pump, and a first electric control valve is arranged on an air conveying pipeline between the air pump and the indoor environment; an exhaust port of the $CO_2$ adsorption chamber is connected to an atmosphere outlet, and a third electric control valve is arranged between the exhaust port of the $CO_2$ adsorption chamber and the atmosphere outlet; an air outlet of the $CO_2$ adsorption chamber is connected with an air inlet of the vacuum pump, and a second electric control valve is arranged on an air conveying pipeline between the air outlet of the $CO_2$ adsorption chamber and the air inlet of the vacuum pump; an air outlet of the vacuum pump is connected with an air inlet of the air storage cavity, and an air outlet of the air storage cavity is connected with a greenhouse air supply port; a fourth electric control valve is arranged on an air conveying pipeline between the air outlet of the air storage cavity and the greenhouse air supply port; and the greenhouse air supply port is connected with a greenhouse.

Further, an adsorption material filled in the $CO_2$ adsorption chamber is one of zeolite 13X, activated carbon, amino modified silica gel and an organic metal framework.

Further, the desorption temperature in the $CO_2$ adsorption chamber ranges from 80° C. to 150° C.

Further, the greenhouse is provided with a $CO_2$ concentration detector which is used for controlling the concentration of $CO_2$ in the greenhouse to be 800-1500 μmol/mol in summer and 600-1000 μmol/mol in winter.

Further, the carbon capture unit and the high-concentration $CO_2$ supply unit are respectively integrated.

The present disclosure has the following beneficial effects:

According to the movable carbon capture system applied to agriculture-harmonious buildings in the present disclosure, the carbon capture unit captures $CO_2$ from the interior of the building and stores the $CO_2$, so that the indoor $CO_2$ concentration can be reduced, the indoor air quality is effectively improved, and the human body comfort level is improved; meanwhile, the high-concentration $CO_2$ supply unit supplies the stored $CO_2$ and the captured $CO_2$ to the greenhouse to serve as a carbon source, it can be guaranteed that the $CO_2$ in the greenhouse is kept in a stable state with the appropriate concentration, indispensable carbon fertilizer is applied to plants, and therefore the purpose of improving the quality of crops is achieved. Therefore, from the aspect of improving the indoor air quality and meeting the requirement of plants in the greenhouse for $CO_2$, a carbon capture and carbon supply system is formed by locally taking materials, the concentration of $CO_2$ in the building is reduced, the plant growth is promoted, and the effect of two purposes is achieved. In addition, the carbon capture unit and the high-concentration $CO_2$ supply unit in the system are respectively integrated, are flexible to move, are not limited to a certain area, can run at different places, and even can be used in a cross-area mode, so that the cost is saved, and the effect of multiple purposes is achieved.

BRIEF DESCRIPTION OF THE DRAWINGS

The drawing is a structural schematic diagram of a movable carbon capture system applied to agriculture-harmonious buildings in the present disclosure.

REFERENCE SIGNS 1, indoor environment; 2, air conveying pipeline; 3, first electric control valve; 4, air pump; 5, adsorption chamber; 6, second electric control valve; 7, third electric control valve; 8, vacuum pump; 9, air storage cavity; 10, atmosphere outlet; 11, greenhouse air supply port; 12, fourth electric control valve; and 13, $CO_2$ concentration detector.

DETAILED DESCRIPTION OF THE EMBODIMENTS

For the purpose that the summary, characteristics and effect of the present disclosure can be further understood, the following embodiments are exemplified and will be described in detail with reference to the attached FIGURES as follows:

As shown in the drawing, the embodiment provides a movable carbon capture system applied to agriculture-harmonious buildings, and the movable carbon capture system mainly comprises a carbon capture unit and a high-concentration $CO_2$ supply unit. If $CO_2$ in the building is used as a carbon source to supply carbon fertilizer to a greenhouse, the content of $CO_2$ in the building can be effectively reduced, and the requirement of plants for $CO_2$ can also be met to the maximum extent.

The carbon capture unit comprises a $CO_2$ adsorption chamber 5 communicating with the interior of the indoor environment 1 in the building, an air pump 4 and an atmosphere outlet 10. An adsorption material filled in the $CO_2$ adsorption chamber 5 can be zeolite 13X, activated carbon, amino modified silica gel, an organic metal framework (MOFs) and the like. The desorption temperature in the $CO_2$ adsorption chamber 5 ranges from 80° C. to 150° C., and the temperature can fully utilize medium and low temperature exhaust heat generated in the fields of industry, agriculture, daily life and the like. An air inlet of the $CO_2$ adsorption chamber 5 is connected with the air pump 4 and a first electric control valve 3 through an air conveying pipeline 2 in sequence, and is finally connected to the indoor environment 1. An exhaust port of the $CO_2$ adsorption chamber 5 is connected with the atmosphere outlet 10, and a third electric control valve 7 is arranged on an air conveying pipeline 2 between the exhaust port of the $CO_2$ adsorption chamber 5 and the atmosphere outlet 10.

The high-concentration $CO_2$ supply unit comprises a vacuum pump 8 and an air storage cavity 9. An air inlet of the vacuum pump 8 is connected with an air outlet of the $CO_2$ adsorption chamber 5, and a second electric control valve 6 is arranged on an air conveying pipeline 2 between the vacuum pump 8 and the $CO_2$ adsorption chamber 5. An exhaust port of the vacuum pump 8 is connected with an air inlet of the air storage cavity 9, an exhaust port of the air storage cavity 9 is connected with a greenhouse air supply port 11, and a fourth electric control valve 12 is arranged on an air conveying pipeline 2 between an exhaust port of the air storage cavity 9 and the greenhouse air supply port 11.

The greenhouse air supply port 11 is connected to the greenhouse, the greenhouse is provided with a $CO_2$ concentration detector 13, and the concentration of $CO_2$ in the greenhouse can be controlled to be 800-1500 μmol/mol in summer and 600-1000 pmol/mol in winter.

The carbon capture unit and the high-concentration $CO_2$ supply unit in the movable carbon capture system are respectively integrated, can randomly move, and are convenient for running at different places.

The working flow of the carbon capture unit in the present disclosure is as follows: after the first electric control valve 3 is opened, air in the indoor environment 1 in the building is sucked in by using the air pump 4, the air is fed into the $CO_2$ adsorption chamber 5 through the air conveying pipeline 2, $CO_2$ in the air is adsorbed by the adsorption material in the $CO_2$ adsorption chamber 5, the second electric control valve 6 is closed, the third electric control valve 7 is opened, and the treated air is discharged into the atmosphere through the atmosphere outlet 10. The air pump 4 provides power for circular flow of air, and the adsorption chamber 5 guarantees that $CO_2$ gas with high concentration is obtained. After running for a period of time, the first electric control valve 3 and the atmosphere outlet 10 are closed, and the $CO_2$ adsorption chamber 5 starts to perform a desorption process to release $CO_2$.

The working flow of the high-concentration $CO_2$ supply unit in the present disclosure is as follows: the second electric control valve 6, the third electric control valve 7 and the fourth electric control valve 12 are closed, the vacuum pump 8 is used for vacuumizing the air storage cavity 9, the second electric control valve 6 is opened, and high-concentration $CO_2$ in the $CO_2$ adsorption chamber 5 flows into the air storage cavity 9 under the action of pressure difference. The $CO_2$ concentration detector 13 is opened to detect the concentration of $CO_2$ in the greenhouse, when the concentration of $CO_2$ in the greenhouse is lower than a standard value, the fourth electric control valve 12 is opened, high-concentration $CO_2$ flows into the greenhouse, and when the concentration of $CO_2$ in the greenhouse reaches a certain value, the fourth electric control valve 12 is closed, so that the concentration of $CO_2$ in the greenhouse is kept at a stable value, and the growth of crops is guaranteed.

In the system, the adsorption efficiency of $CO_2$ in the atmosphere and the volume of the adsorption chamber depend on the property of the adsorption material in the adsorption chamber, the concentration of $CO_2$ in the atmosphere, corresponding operation strategy requirements and the like.

The $CO_2$ collected by the carbon capture unit is used in the plant growth process of the greenhouse, so that the utilization of chemical fertilizer is reduced, the quality of plants is effectively improved, and no secondary pollution is caused to the environment. According to the movable carbon capture system, the concentration of indoor carbon dioxide can be effectively alleviated, and the movable carbon capture system is very suitable for $CO_2$ capture in densely populated buildings and has certain universal significance.

The embodiments of the present disclosure are described above with reference to the attached FIGURES, but the present disclosure is not limited to the foregoing embodiments. The foregoing embodiments are only illustrative rather than restrictive. Inspired by the present disclosure, those skilled in the art can still derive many specific variations without departing from the essence of the present disclosure and the protection scope of the claims. All these variations shall fall within the protection of the present disclosure.

What is claimed is:

1. A movable carbon capture system applied to an agriculture-harmonious building comprising:
   a carbon capture unit and a high-concentration $CO_2$ supply unit, wherein the carbon capture unit comprises a $CO_2$ adsorption chamber and an air pump, and the high-concentration $CO_2$ supply unit comprises a vacuum pump and an air storage cavity;
   an air inlet of the $CO_2$ adsorption chamber connected to an indoor environment through the air pump, and a first electric control valve is arranged on an air conveying pipeline between the air pump and the indoor environment; an exhaust port of the $CO_2$ adsorption chamber is connected to an atmosphere outlet, and a third electric control valve is arranged between the exhaust port of the $CO_2$ adsorption chamber and the atmosphere outlet; and
   an air outlet of the $CO_2$ adsorption chamber connected with an air inlet of the vacuum pump, and a second electric control valve is arranged on an air conveying pipeline between the air outlet of the $CO_2$ adsorption chamber and the air inlet of the vacuum pump; an air outlet of the vacuum pump is connected with an air inlet of the air storage cavity, and an air outlet of the air storage cavity is connected with a greenhouse air supply port; a fourth electric control valve is arranged on an air conveying pipeline between the air outlet of the air storage cavity and the greenhouse air supply port; and the greenhouse air supply port is connected with a greenhouse.

2. The movable carbon capture system according to claim 1, wherein an adsorption material filled in the $CO_2$ adsorption chamber is one of zeolite 13X, activated carbon, amino modified silica gel, and an organic metal framework.

3. The movable carbon capture system according to claim 1, wherein a desorption temperature in the $CO_2$ adsorption chamber ranges from 80° C. to 150° C.

4. The movable carbon capture system according to claim 1, wherein the greenhouse is provided with a $CO_2$ concentration detector for controlling a concentration of $CO_2$ in the greenhouse to be 800-1500 μmol/mol in summer and 600-1000 μmol/mol in winter.

5. The movable carbon capture system according to claim 1, wherein the carbon capture unit and the high-concentration $CO_2$ supply unit are respectively integrated.

* * * * *